2,880,187

COPOLYMERS OF THE FATTY ACID ESTER OF A PHENOXY ETHANOL-FORMALDEYDE CONDENSATION PRODUCT AND AN ETHYLENIC MONOMER

John E. Hanle, Westfield, N.J., and Alfred M. Tringali, Springfield Gardens, and Henry Yuska, Kew Gardens, N.Y., assignors to Interchemical Corporation, New York, N.Y., a corporation of Ohio No Drawing. Application May 20, 1955
Serial No. 510,038

4 Claims. (Cl. 260—19)

This invention relates to new synthetic resins useful in the preparation of coating compositions such as paints, lacquers, varnishes and enamels, and is directed to resins which are film forming, particularly from solutions in organic solvents, to yield films which are rapid drying, tough and particularly resistant to alkali.

The new resins which form the subject of this invention are interpolymers of from 15 to 70 parts by weight of an ethylenic monomer of the class consisting of styrene and methyl methacrylate, with from 85 to 30 parts by weight of esters of long chain fatty acids containing a plurality of double bonds (such as drying oil acids) with the polymeric resinous polyhydric alcohols obtained by reacting phenoxy ethanol with formaldehyde, in the ratio of a minimum of 30 parts fatty acid to 70 parts resinous alcohol, up to the amount of fatty acid necessary for complete esterification of the available hydroxyl group in the resinous alcohol (about 60 to 65% fatty acids). Optimum results are obtained where the fatty acids contain substantial percentages of conjugated double bonds.

In general, interpolymerization of the two reactants can be obtained by heating them together with a peroxide type catalyst, preferably in the presence of an organic solvent for the mixture—e.g., toluol, xylol, solvent naphtha, aromatic petroleum diluents and the like.

At least 15 parts of the ethylenic monomer to 85 parts of ester are necessary before a noticeable improvement in hardness and drying is obtained, as compared with films from the esters alone. As the amount of ethylenic monomer is increased, the films become harder and more rapid drying; when the ethylenic monomer exceeds about 70%, however, the films become brittle, and are no longer satisfactory for most coating applications.

The ratio of resinous polyhydric alcohol to fatty acid in the ester also plays a part in the film properties, the fatty acid acting to render the films more flexible. At least 30 parts of fatty acid to 70 of resinous alcohol are needed to produce films with sufficient flexibility, even at the lowest ratios of ethylenic monomer. No more should be used than is sufficient for complete esterification of the resinous alcohol—free fatty acid is undesirable. The maximum amount of fatty acids—i.e.—that necessary for complete esterification—varies somewhat with the molecular weight of the resinous alcohol, from about 60 to 65% of the ester.

Typical examples of the preparation of our new resins are as follows:

*Example 1.—Phenoxy ethanol-formaldehyde resin*

91 pounds phenoxy ethanol
    21.8 pounds 91% paraform
    103.0 grams sulfuric acid in 1 pound water where charged into a glass lined kettle equipped with a reflux condenser and heated up to 100° C. over a period of two hours. The reaction mixture was held another two and one half hours, when an exothermic reaction set in which carried the temperature to 165° C. in about 35 minutes. A quart of water was added to quell the reaction, and heating continued at about 150° C. The batch was neutralized with 340 grams $Ba(OH)_2 \cdot 8H_2O$; the temperature was raised to liquefy the melt, which was then cast. 96.5 pounds of resinous polyol was obtained with M.P. 78° C.—molecular weight about 700, OH per molecule about 5.

By varying the procedure, base resins of varying melting point and molecular weight can be obtained—up to about 1000 molecular weight, and a M.P. of the order of 85° C. In general, the melting point and molecular weight of the resinous alcohol have only a minor effect on the properties of the finished resins—somewhat harder and more flexible films, and somewhat greater tendency to gelation, are obtained as the molecular weight increases.

*Example 2.—Preparation of ester*

22.2 pounds of resin of Example 1
    14.8 pounds dehydrated castor oil fatty acid were heated in a stainless steel kettle equipped with a reflux condenser and water trap, running the temperature up slowly. Foaming, indicating reaction, began at 170° C. (slow reaction is desirable to prevent excessive foaming). Heating was continued to about 240° C., and the batch held there about two hours, to an acid value below 5.0. The batch was cooled to 130° C., diluted with 23.5 pounds xylol, drained and filtered. 57 pounds of solution was obtained.

Similar esterifications can be made with various fatty acids, and with phenoxyethanol-formaldehyde resinous alcohols of various molecular weight.

*Example 3*

20.3 pounds of resin of Example 2
    12.0 pounds styrene
    7.7 pounds xylol
    109 grams cumene hydroperoxide were charged into a 10 gallon stainless steel kettle with a water separator and reflux condenser, and heated to 137° over a period of two hours and fifteen minutes, when reflux started. The reaction was maintained at reflux (app. 140° C.) for three hours, and a second 109 grams of catalyst added. A sample at this point indicated 88.8% conversion of styrene. The batch was allowed to cool in the kettle, to 100° C., and run through a sparkler filter. The final resin solution was 52.2% solids, had a viscosity of 39.8 poises, at 25° C. temperature.

Films of the product, when cast on glass or steel, baked rapidly to produce a hard, tough alkali resistant coating. The product also air dries rapidly.

The run was repeated with methyl methacrylate replacing the styrene. The resultant resin gave a bit tougher film, but otherwise was very similar.

*Example 4*

The procedure of Example 3 was repeated, using 15 parts by weight of styrene to 85 parts by weight of the ester of Example 2. The resultant product was less viscous (4.52 poises at 25° C.—58.6% solids in xylol) and dried more slowly than the product of Example 3.

*Example 5*

When methyl methacrylate was substituted for the styrene in Example 4, a very similar product was obtained—a trifle less viscous, but substantially identical in film properties.

Example 6

Example 3 was repeated, using 70 styrene to 30 of the ester of Example 3. The resultant product was very rapid drying and produced films which were hard, but rather brittle as compared with the films produced by the products of Examples 3, 4 and 5. The films, while still satisfactory for some coating uses, were sufficiently brittle to be undesirable where flexibility is a major factor.

Example 7

The copolymerizations of Example 3 were repeated, with both styrene and methyl methacrylate, using tertiary butyl perbenzoate, benzoyl peroxide and ditertiary butyl peroxide. All gave good results.

Example 8

A series of resins were made, using phenoxy ethanol formaldehyde resins of different melting point, ranging from about 50° C. (mol wt. 400 to 500) to about 80° (mol wt. 1000) with equal parts of resin and dehydrated castor oil fatty acids in the ester, and using equal parts of styrene and ester, with cumene hydroperoxide as the catalyst. Results indicated that the higher molecular weight resins produce reaction mixtures which tend to gel more readily, but all of them can be controlled by care in preparation of the batch. Slightly improved alkali resistance was noted with the higher molecular weight resinous alcohol.

Example 9

Variations in the fatty acid content of the ester were made, running from 30 dehydrated castor oil fatty acid; 70 resinous alcohol to 62.5% dehydrated castor oil fatty acid: 37.5 resinous alcohol (using the product of Example 1). As would be expected, flexibility increased as fatty acid content went up. The lowest fatty acid content was on the verge of being too brittle. When 62.5% fatty acid is present in the ester, 50:50 copolymers with styrene or methyl methacrylate produce films somewhat softer and more flexible than corresponding copolymers with lower fatty acid content. Fatty acid above 62.5% will not react, being in excess, and such products are undesirable because of the presence of the free acid.

Example 10

Example 3 was repeated both with styrene and methyl methacrylate, using China-wood oil fatty acids, linseed fatty acids and soya oil fatty acids. The China-wood oil fatty acids gave esters which were difficult to handle without gelation; the other acids reacted less rapidly in the copolymerization reaction. Soya and linseed esters give copolymers with excellent film forming properties, hardness and alkali resistance.

The resin solutions may be used by themselves to produce clear coatings; or they may be compounded with other film formers to form varnishes and lacquers with varying properties. They may be used as the bases for paints and enamels by dispersing conventional pigments and fillers with them.

While we have shown only a limited number of examples of our invention, it is obvious that examples can be multiplied indefinitely without departing from the scope of the invention as defined in the claims.

We claim:

1. As new synthetic resins, the products obtained by heating together, in the presence of an organic peroxide catalyst (1) 15 to 70 parts by weight of an ethylenic monomer of the class consisting of styrene and methyl methacrylate with (2) 85 to 30 parts by weight of an ester of 30 to 65 parts by weight drying oil fatty acid and 70 to 35 parts by weight of the resinous alcohol obtained by reacting phenoxy ethanol with formaldehyde.

2. The composition of claim 1, in which the drying oil fatty acid contains substantial percentages of conjugated double bonds.

3. A film forming composition characterized by the production of rapid drying tough alkali resistant films comprising the synthetic resin of claim 1 and sufficient organic solvent therefor to produce a liquid film forming composition.

4. The method of producing a new synthetic resin which comprises heating together (1) 15 to 70 parts by weight of an ethylenic monomer of the class consisting of styrene and methyl methacrylate with (2) 85 to 30 parts by weight of an ester of 30 to 65 parts by weight drying oil fatty acid and 70 to 35 parts by weight of the resinous alcohol obtained by reacting phenoxy ethanol with formaldehyde, in the presence of an organic peroxide catalyst.

References Cited in the file of this patent

UNITED STATES PATENTS

| | | |
|---|---|---|
| 2,610,955 | De Groote et al. | Sept. 16, 1952 |
| 2,731,428 | Harrison | Jan. 17, 1956 |

OTHER REFERENCES

Brody: "Organic Finishing," September 1953, vol. 14, pages 8, 10, and 11.